United States Patent
Brown

[11] Patent Number: 6,016,101
[45] Date of Patent: Jan. 18, 2000

[54] ILLUMINATING BICYCLE REFLECTOR

[76] Inventor: Patrick M. Brown, 990 Loma Dr., Ojai, Calif. 93023

[21] Appl. No.: 09/193,810

[22] Filed: Nov. 17, 1998

[51] Int. Cl.[7] ............................................. B62J 3/00
[52] U.S. Cl. .................... 340/432; 362/473; 362/276; 362/800; 362/802; 362/545; 362/464
[58] Field of Search .................... 340/432, 463, 340/427; 362/473, 276, 545, 800, 802, 249, 235, 236, 190, 191, 196, 543, 544, 464

[56] References Cited

U.S. PATENT DOCUMENTS

| 2,621,081 | 12/1952 | Mann . | |
|---|---|---|---|
| 4,787,014 | 11/1988 | Wodder et al. | 362/72 |
| 4,796,972 | 1/1989 | Thomas | 350/99 |
| 4,980,667 | 12/1990 | Ames | 340/432 |
| 5,278,732 | 1/1994 | Frankum | 362/72 |
| 5,333,101 | 7/1994 | McEvoy | 340/432 |
| 5,477,427 | 12/1995 | Forman | 362/72 |
| 5,667,290 | 9/1997 | Cioletti et al. | 340/432 |
| 5,800,039 | 9/1998 | Lee | 340/432 |
| 5,803,574 | 9/1998 | Szaniszlo | 362/32 |

*Primary Examiner*—Nina Tong
*Attorney, Agent, or Firm*—Goldstein & Canino

[57] ABSTRACT

An illuminating bicycle reflector including a housing securable between spokes of a standard bicycle wheel. The housing is comprised of an arcuate outer portion, an arcuate inner portion, and a hollow interior disposed therebetween. The arcuate inner portion has a removable access panel coupled therewith. The access panel exposes a power source. A plurality of LED's are disposed within the hollow interior of the housing in a spaced relationship. The plurality of LED's are in communication with the power source to facilitate activation thereof. A flasher circuit is in communication with the plurality of LED's and the power source.

5 Claims, 2 Drawing Sheets

ILLUMINATING BICYCLE REFLECTOR

BACKGROUND OF THE INVENTION

1. Field of the Invention

The present invention relates to an illuminating bicycle reflector and more particularly pertains to illuminating a series of flashing lights as a wheel rotates with an illuminating bicycle reflector.

2. Description of the Prior Art

The use of bicycle wheel attachments is known in the prior art. More specifically, bicycle wheel attachments heretofore devised and utilized for the purpose of decorating bicycle wheels are known to consist basically of familiar, expected and obvious structural configurations, notwithstanding the myriad of designs encompassed by the crowded prior art which have been developed for the fulfillment of countless objectives and requirements.

By way of example, U.S. Pat. No. 2,621,081 to Mann; and U.S. Pat. No. 4,796,972 to Thomas.

While these devices fulfill their respective, particular objective and requirements, the aforementioned patents do not describe an illuminating bicycle reflector for illuminating a series of flashing lights as a wheel rotates.

In this respect, the illuminating bicycle reflector according to the present invention substantially departs from the conventional concepts and designs of the prior art, and in doing so provides an apparatus primarily developed for the purpose of illuminating a series of flashing lights as a wheel rotates.

Therefore, it can be appreciated that there exists a continuing need for new and improved illuminating bicycle reflector which can be used for illuminating a series of flashing lights as a wheel rotates. In this regard, the present invention substantially fulfills this need.

SUMMARY OF THE INVENTION

In the view of the foregoing disadvantages inherent in the known types of bicycle wheel attachments now present in the prior art, the present invention provides an improved illuminating bicycle reflector. As such, the general purpose of the present invention, which will be described subsequently in greater detail, is to provide a new and improved illuminating bicycle reflector and method which has all the advantages of the prior art and none of the disadvantages.

To attain this, the present invention essentially comprises a housing securable between spokes of a standard bicycle wheel. The housing is comprised of an arcuate outer portion, an arcuate inner portion, and a hollow interior disposed therebetween. The housing is fabricated of a reflective plastic material. The arcuate outer portion is coupled together with the arcuate inner portion via screws. The housing has a pair of slotted apertures extending through the arcuate outer and inner portions for receiving hardware therethrough to facilitate securement of the housing between spokes of a standard bicycle wheel. The arcuate inner portion has a removable access panel coupled therewith. The access panel exposes a power source. The power source is a battery. A plurality of LED's are disposed within the hollow interior of the housing in a spaced relationship. The plurality of LED's are in communication with the power source to facilitate activation thereof. A flasher circuit is in communication with the plurality of LED's and the power source. An inertia switch is in communication with the plurality of LED's and the power source. A photo switch is in communication with the plurality of LED's and the power source.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved illuminating bicycle reflector which has all the advantages of the prior art bicycle wheel attachments and none of the disadvantages.

It is another object of the present invention to provide a new and improved illuminating bicycle reflector which may be easily and efficiently manufactured and marketed.

It is a further object of the present invention to provide a new and improved illuminating bicycle reflector which is of durable and reliable construction.

An even further object of the present invention is to provide a new and improved illuminating bicycle reflector which is susceptible of a low cost of manufacture with regard to both materials and labor, and which accordingly is then susceptible of low prices of sale to the consuming public, thereby making such an illuminating bicycle reflector economically available to the buying public.

Even still another object of the present invention is to provide a new and improved illuminating bicycle reflector for illuminating a series of flashing lights as a wheel rotates.

Lastly, it is an object of the present invention to provide a new and improved illuminating bicycle reflector including a housing securable between spokes of a standard bicycle wheel. The housing is comprised of an arcuate outer portion, an arcuate inner portion, and a hollow interior disposed therebetween. The arcuate inner portion has a removable access panel coupled therewith. The access panel exposes a power source. A plurality of LED's are disposed within the hollow interior of the housing in a spaced relationship. The plurality of LED's are in communication with the power source to facilitate activation thereof. A flasher circuit is in communication with the plurality of LED's and the power source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
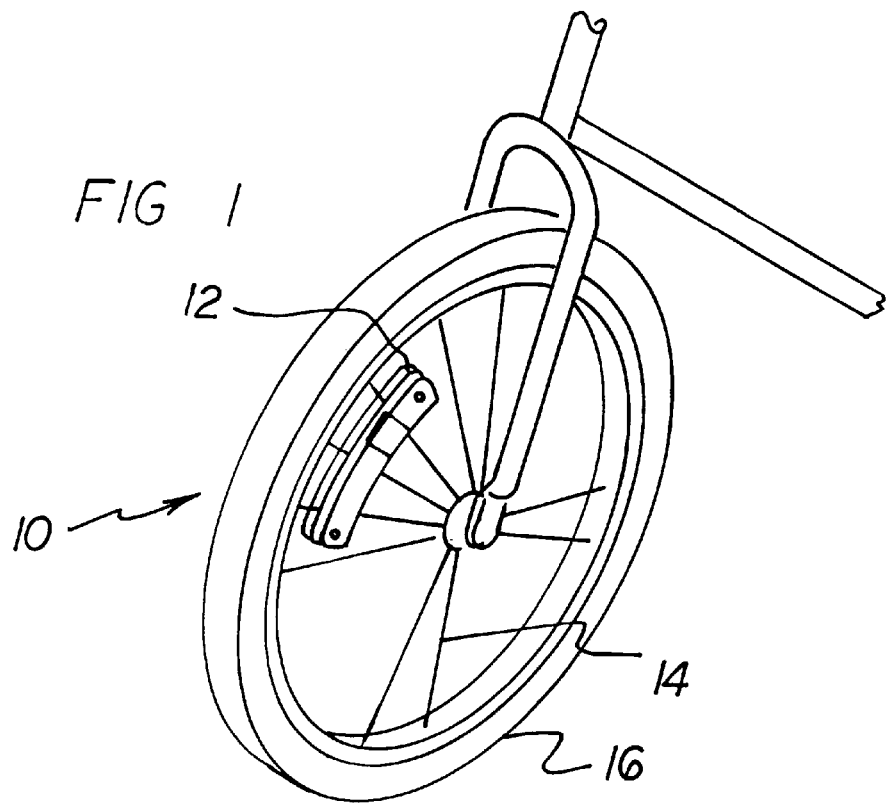
FIG. 1 is a perspective view of the preferred embodiment of the illuminating bicycle reflector constructed in accordance with the principles of the present invention.
Figure 2:
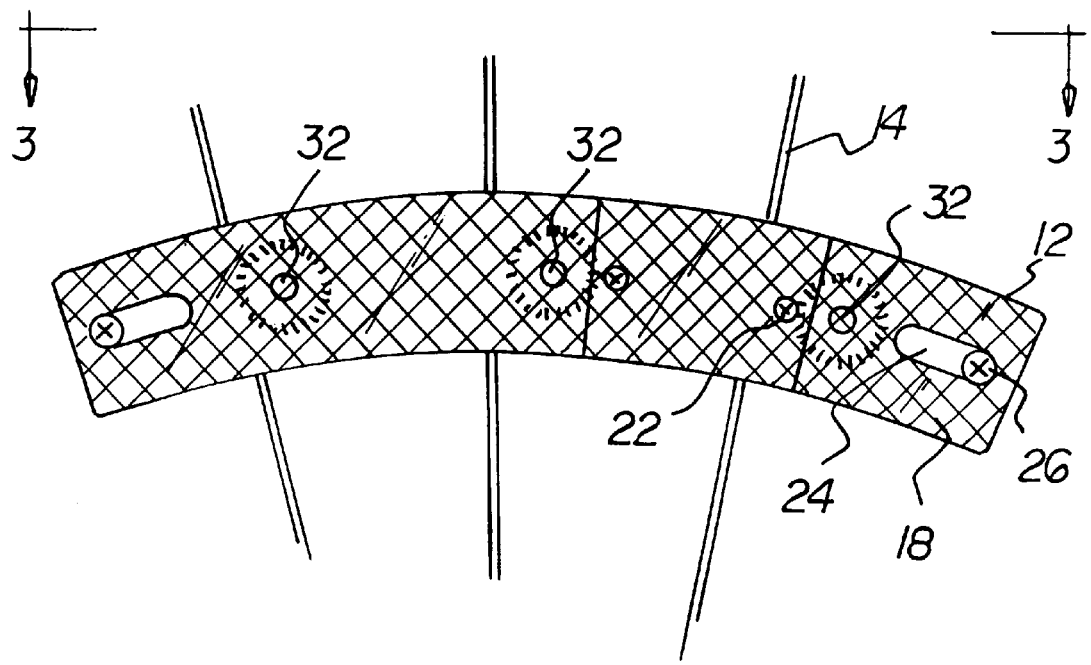
FIG. 2 is a cross-sectional view of the present invention illustrated in FIG. 1.
Figure 3:
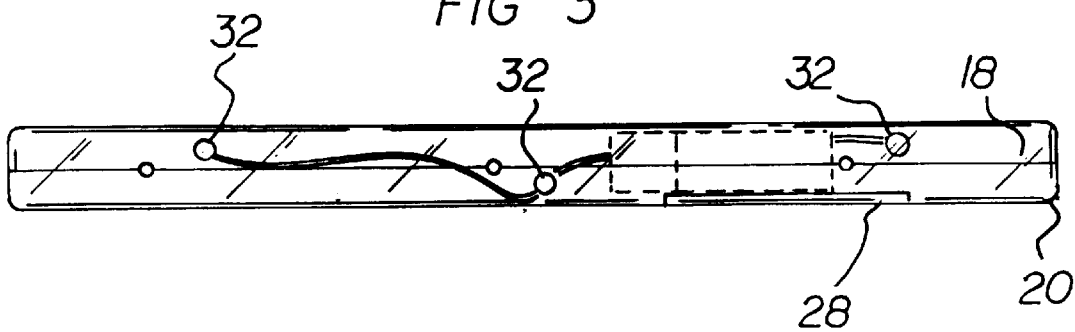
FIG. 3 is a top plan view of the present invention as taken along line 3—3 of FIG. 2.
Figure 4:
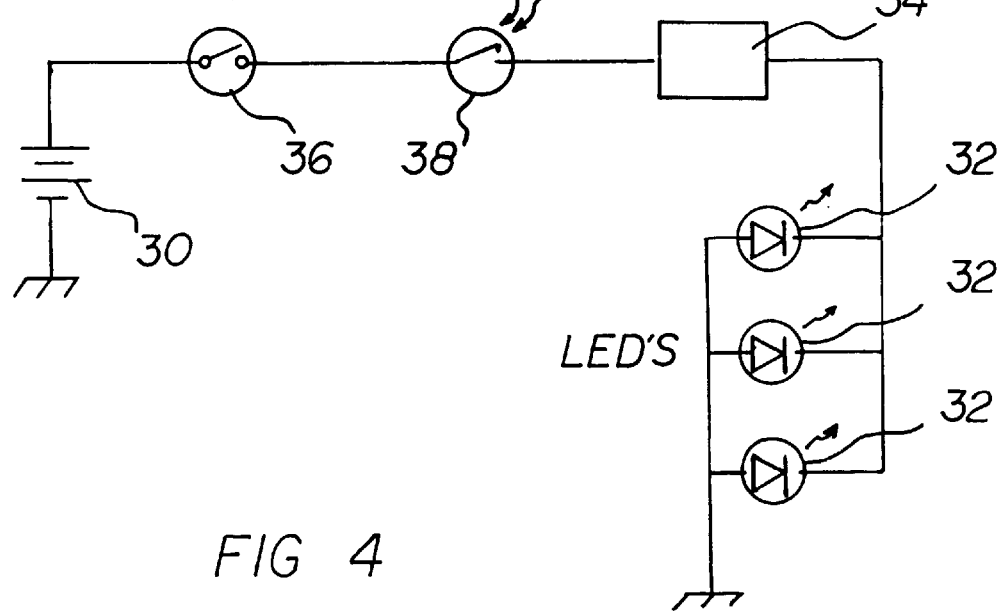
FIG. 4 is a schematic illustration of the present invention.

With reference now to the drawings, and in particular, to FIGS. 1 through 4 thereof, the preferred embodiment of the new and improved illuminating bicycle reflector embodying the principles and concepts of the present invention and generally designated by the reference number 10 will be described.

Specifically, it will be noted in the various Figures that the device relates to a illuminating bicycle reflector for illuminating a series of flashing lights as a wheel rotates. In its broadest context, the device consists of a housing, a plurality of LED's, a flasher circuit, an inertia switch, and a photo switch. Such components are individually configured and correlated with respect to each other so as to attain the desired objective.

The housing 12 is securable between spokes 14 of a standard bicycle wheel 16. The housing 12 is comprised of an arcuate outer portion 18, an arcuate inner portion 20, and a hollow interior disposed therebetween. The arcuate outer portion 18 and the arcuate inner portion 20 separate to receive the spokes therebetween. Small recesses are formed in outer edges of the arcuate portions to ensure proper engagement. The housing 12 is fabricated of a reflective plastic material. The arcuate outer portion 18 is coupled together with the arcuate inner portion 20 via screws 22. The housing 12 has a pair of slotted apertures 24 extending through the arcuate outer and inner portions 18,20 for receiving hardware 26 therethrough to facilitate securement of the housing 12 between spokes 14 of a standard bicycle wheel 16. The slotted apertures 24 allow for flexibility in securing the housing 12 between spokes 14. The arcuate inner portion has a removable access panel 28 coupled therewith. The access panel 28 exposes a power source 30. The power source 30 is a battery. Alternate power sources could also be employed.

The plurality of LED's 32 are disposed within the hollow interior of the housing 12 in a spaced relationship. Note FIGS. 2 and 3. The plurality of LED's 32 are in communication with the power source 30 to facilitate activation thereof. In the preferred embodiment, three LED's are utilized. However, any number could be used.

The flasher circuit 34 is in communication with the plurality of LED's 32 and the power source 30. The flasher circuit 34 is one that is standard in the art and simply causes the LED's to flash when activated.

The inertia switch 36 is in communication with the plurality of LED's 32 and the power source 30. The inertia switch 36 requires that the wheel 16 of the bicycle be in motion in order for the LED's to be activated.

The photo switch 38 is in communication with the plurality of LED's 32 and the power source 30. The photo switch 38 requires that a certain level of darkness be present in order for the LED's to be activated, whether or not the wheel of the bicycle is in motion.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An illuminating bicycle reflector for illuminating a series of flashing lights as a wheel rotates comprising, in combination:

a housing securable between spokes of a standard bicycle wheel, the housing being comprised of an arcuate outer portion, an arcuate inner portion, and a hollow interior disposed therebetween, the housing being fabricated of a reflective, generally translucent plastic material, the arcuate outer portion being coupled together with the arcuate inner portion via screws, the housing having a pair of slotted apertures extending through the arcuate outer and inner portions for receiving hardware therethrough to facilitate securement of the housing between spokes of a standard bicycle wheel, the arcuate inner portion having a removable access panel coupled therewith, the access panel exposing a power source, the power source being a battery;

a plurality of LED's disposed within the hollow interior of the housing in a spaced relationship, the plurality of LED's being in communication with the power source to facilitate activation thereof;

a flasher circuit being in communication with the plurality of LED's and the power source;

an inertia switch being in communication with the plurality of LED's and the power source;

a photo switch being in communication with the plurality of LED's and the power source.

2. An illuminating bicycle reflector for illuminating a series of flashing lights as a wheel rotates comprising, in combination:

a housing securable between spokes of a standard bicycle wheel, the housing being comprised of an arcuate outer portion, an arcuate inner portion, and a hollow interior disposed therebetween, the arcuate inner portion having a removable access panel coupled therewith, the access panel exposing a power source; and wherein the housing has a pair of slotted apertures extending through the arcuate outer and inner portions for receiving hardware therethrough to facilitate securement of the housing between spokes of a standard bicycle wheel;

a plurality of LED's disposed within the hollow interior of the housing in a spaced relationship, the plurality of LED's being in communication with the power source to facilitate activation thereof;

a flasher circuit being in communication with the plurality of LED's and the power source.

3. The illuminating bicycle reflector as set forth in claim 2 wherein the housing is fabricated of a reflective, generally translucent plastic material.

4. The illuminating bicycle reflector as set forth in claim 2 and further including an inertia switch in communication with the plurality of LED's and the power source.

5. The illuminating bicycle reflector as set forth in claim 2 and further including a photo switch in communication with the plurality of LED's and the power source.

* * * * *